(12) United States Patent
Hamada et al.

(10) Patent No.: US 6,938,715 B2
(45) Date of Patent: Sep. 6, 2005

(54) HOOD STRUCTURE OF MOTOR VEHICLE

(75) Inventors: Makoto Hamada, Toyota (JP); Hiroyuki Takahashi, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 161 days.

(21) Appl. No.: 10/327,978

(22) Filed: Dec. 26, 2002

(65) Prior Publication Data

US 2003/0121710 A1 Jul. 3, 2003

(30) Foreign Application Priority Data

Dec. 27, 2001 (JP) .................................. P. 2001-397951

(51) Int. Cl.⁷ .......................... B60R 21/34; B62D 21/12
(52) U.S. Cl. .................. 180/274; 280/730.1; 180/69.21
(58) Field of Search ............................... 180/274, 69.21; 280/730.1; 296/187.04; B60R 21/34

(56) References Cited

U.S. PATENT DOCUMENTS

| 4,249,632 | A | | 2/1981 | Lucchini et al. | |
|---|---|---|---|---|---|
| 4,579,185 | A | * | 4/1986 | Wakasa | 180/69.2 |
| 5,197,560 | A | * | 3/1993 | Oda et al. | 180/69.21 |
| 6,048,022 | A | * | 4/2000 | Ishibashi et al. | 296/187.09 |
| 6,530,449 | B2 | * | 3/2003 | Sasaki et al. | 180/274 |

FOREIGN PATENT DOCUMENTS

| DE | 100 25 784 | | 5/2000 |
|---|---|---|---|
| DE | 101 02 597 | | 1/2001 |
| DE | 100 14 832 A1 | * | 10/2001 |
| EP | 0 926 018 A1 | * | 11/1998 |
| EP | 0 992 419 A2 | * | 9/1999 |
| EP | 0 967 128 | | 12/1999 |
| EP | 1 153 810 A2 | | 10/2001 |
| GB | 2 312 190 A | * | 10/1997 |
| GB | 2 344 080 A | * | 5/2000 |
| JP | 6-74533 | | 10/1994 |
| JP | 8-324380 | | 12/1996 |
| JP | 10-152018 | | 6/1998 |
| JP | 11-20741 | | 1/1999 |
| JP | 2000-79859 | | 3/2000 |
| JP | 2000-211553 A | * | 8/2000 |

* cited by examiner

Primary Examiner—Ruth Ilan
(74) Attorney, Agent, or Firm—Finnegan, Henderson, Farabow, Garrett & Dunner, LLP

(57) ABSTRACT

If a control device determines that a collision during a vehicle run has been detected on the basis of a combination of an output signal of a sensor and a vehicle speed signal, an inflator is actuated so as to inflate and deploy an air bag body disposed in an apron upper member. When inflated and deployed, the air bag body raises a longitudinal-direction central portion of a hood. At this time, the longitudinal-direction central portion of the hood bends with a depression serving as an origin of bending.

12 Claims, 17 Drawing Sheets

HOOD STRUCTURE OF MOTOR VEHICLE

INCORPORATION BY REFERENCE

The disclosure of Japanese Patent Applications No. 2001-397951 filed on Dec. 27, 2001, including its specification, drawings and abstract, is incorporated herein by reference in its entirety.

BACKGROUND OF THE INVENTION

1. Field of the Invention

The invention relates to a hood structure of a motor vehicle. More particularly, the invention relates to a motor vehicle hood structure that moves a hood to such a position as to effectively absorb impact energy exerted on a colliding body.

2. Description of the Related Art

A hood structure of a motor vehicle that moves a hood to such a position as to effectively absorb impact energy exerted on a colliding body is described in Japanese Patent Application Laid-Open Publication No. 2000-79859.

As shown in FIG. 17, this hood structure of a motor vehicle includes a pedestrian detection means 100 for detecting collision with a pedestrian or the like, a controller 102 that determines whether to actuate a system upon receiving a signal from the pedestrian detection means 100, a lift mechanism 108 that lifts a rearward portion of a hood 106 if the controller 102 determines that an air bag body 104 needs to be deployed, and an air bag device 110 that inflates and deploys the air bag body 104 after actuation of the lift mechanism 108 has started. The air bag device 110 is disposed below a rearward portion of the hood 106. The air bag body 104 of the air bag device 110 has a partition wall 112 that restricts the maximum distance between a bag's lower wall surface and a bag's upper wall surface, at an intermediate portion in the air bag body 104 in an inflated and deployed state in a longitudinal direction relative to the vehicle, so that when inflated and deployed, the air bag 104 contacts an area in a lower surface of a rearward portion of the hood 106 in a lifted-up state, the area extending over substantially the entire width of the hood 106 in a transverse direction relative to the vehicle, and is exposed rearward of a rear end of the hood 106.

This hood structure of a motor vehicle is constructed so that when collision with a pedestrian or the like is detected, a rearward portion of the hood 106 is lifted with a front portion of the hood 106 being a center of the lifting motion, by the lift mechanism 108. Therefore, if the hood is elongated in the longitudinal direction relative to the vehicle, the amount of lift of a rearward portion of the hood 106 needs to be substantially great in order to secure a load absorption stroke of a longitudinal-direction central portion 106A of the hood 106. Hence, it is difficult to achieve a great amount of lift of the longitudinal-direction central portion of the hood 106 while reducing the hood lift-up time to a predetermined value. As a result, the hood structure has a drawback of a short stroke of load absorption of the longitudinal-direction central portion 106A of the hood 106.

SUMMARY OF THE INVENTION

It is an object of the invention to provide a hood structure of a motor vehicle capable of achieving an increased load absorption stroke of a longitudinal-direction central portion of the hood.

In a first aspect of the invention, a hood structure of a motor vehicle includes a collision detector that detects a collision at a forward portion of the vehicle, and a lifter that raises a vehicle longitudinal-direction central portion of a hood upon receiving a signal from the collision detector.

Therefore, if collision between a colliding body and the forward portion of the vehicle is detected by the collision detector, the lifter directly raises the vehicle longitudinal-direction central portion of the hood upon receiving a signal from the collision detector.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
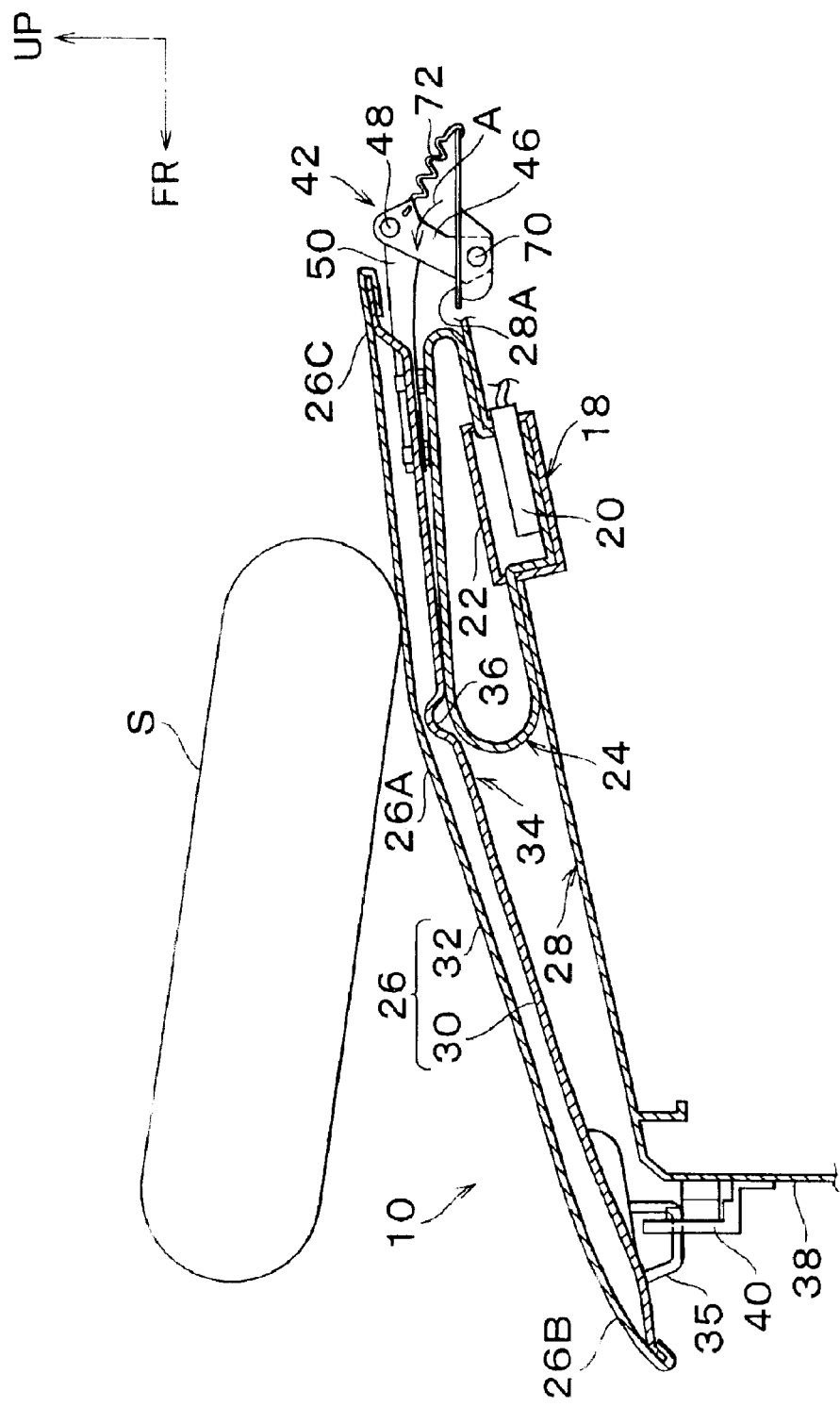
FIG. 1 is a side sectional view of a hood structure of a motor vehicle in accordance with a first embodiment of the invention, illustrating a deployed state of an air bag body.

A first embodiment of the hood structure of a motor vehicle of the invention will be described with reference to FIGS. 1 to 4.

In the drawings, an arrow FR indicates a forward direction relative to a vehicle, and an arrow UP indicates an upward direction relative to the vehicle, and an arrow IN indicates an inward direction along a width of the vehicle.

Figure 2:
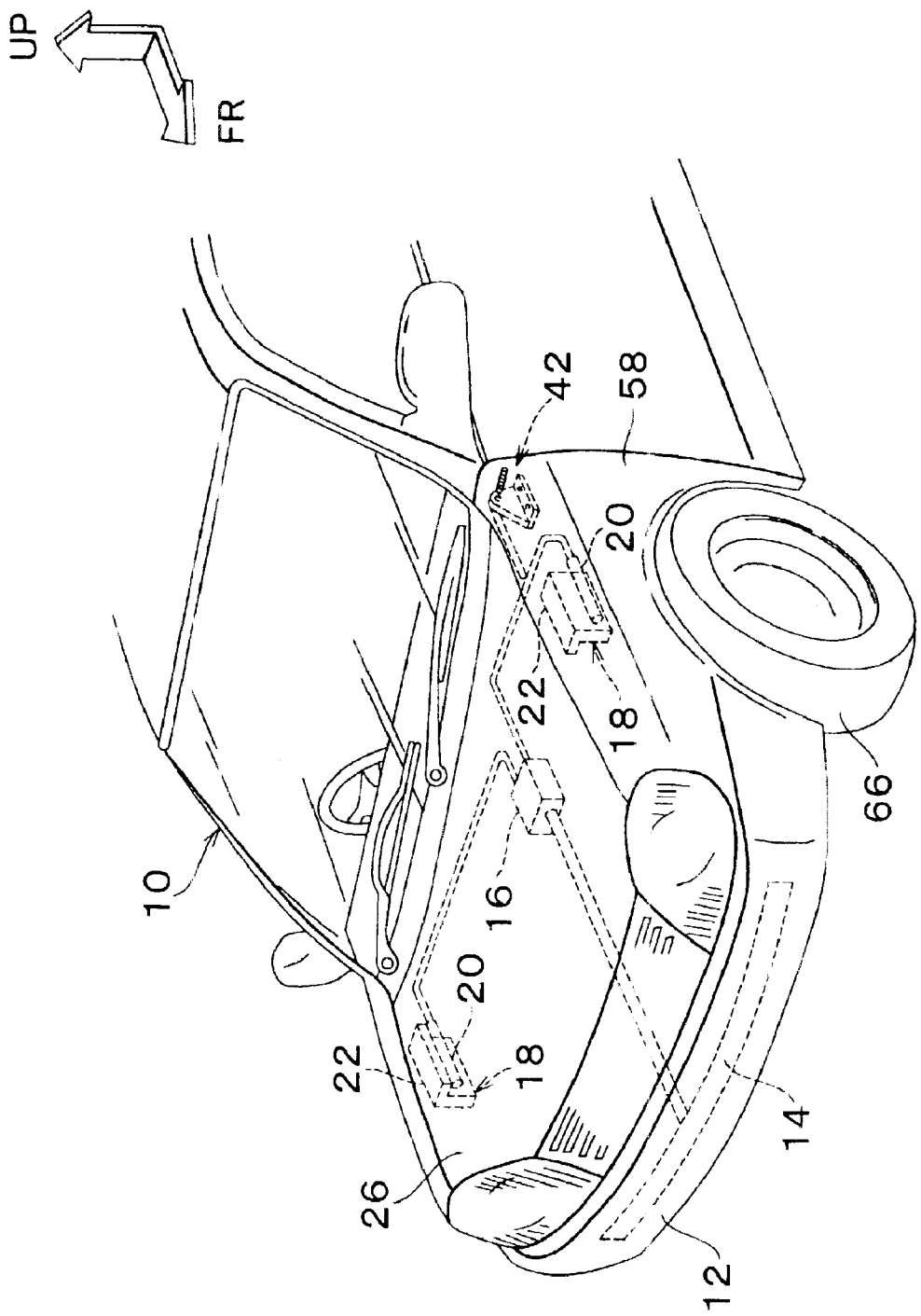
FIG. 2 is a perspective view of the motor vehicle hood structure in accordance with the first embodiment of the invention, viewed from diagonally forward of the vehicle.

As shown in FIG. 2, a vehicle body 10 in this embodiment has a sensor 14 as a collision detector that is provided within a portion of the vehicle body 10 near a surface of a front bumper 12. The sensor 14 detects deformation of the front bumper 12 when the front bumper 12 contacts a pedestrian's leg or the like. The sensor 14 is connected to a control device 16. If the control device 16 determines that an accident has occurred during a run of the motor vehicle on the basis of a combination of an output signal of the sensor 14 and a vehicle speed signal, the control device 16 supplies an actuation current to air bag devices 18. When the actuation current flows through the air bag devices 18, an inflator 20 of each air bag device 18 is ignited to generate gas.

Figure 3:
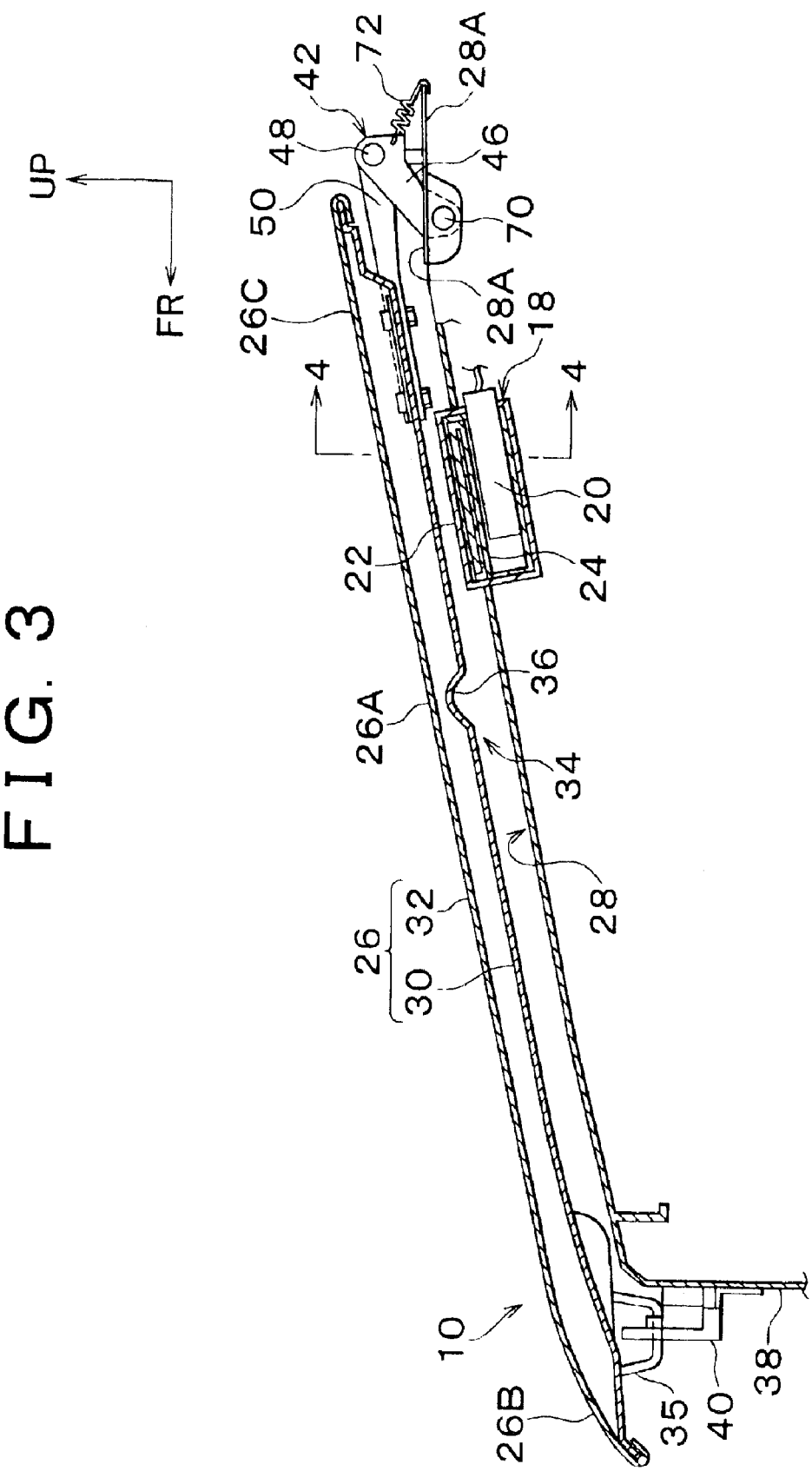
FIG. 3 is a side sectional view of the motor vehicle hood structure of the first embodiment of the invention, illustrating a normal state of the hood structure.

As indicated in FIG. 3, the gas from the inflator 20 is fed into an air bag body 24 as a lifter which is contained in a folded state within an air bag case 22. The air bag case 22 is disposed at a site on an apron upper member 28 which faces a position slightly rearward of a central portion 26A of a hood 26 in a longitudinal direction relative to the vehicle body 10.

Figure 4:
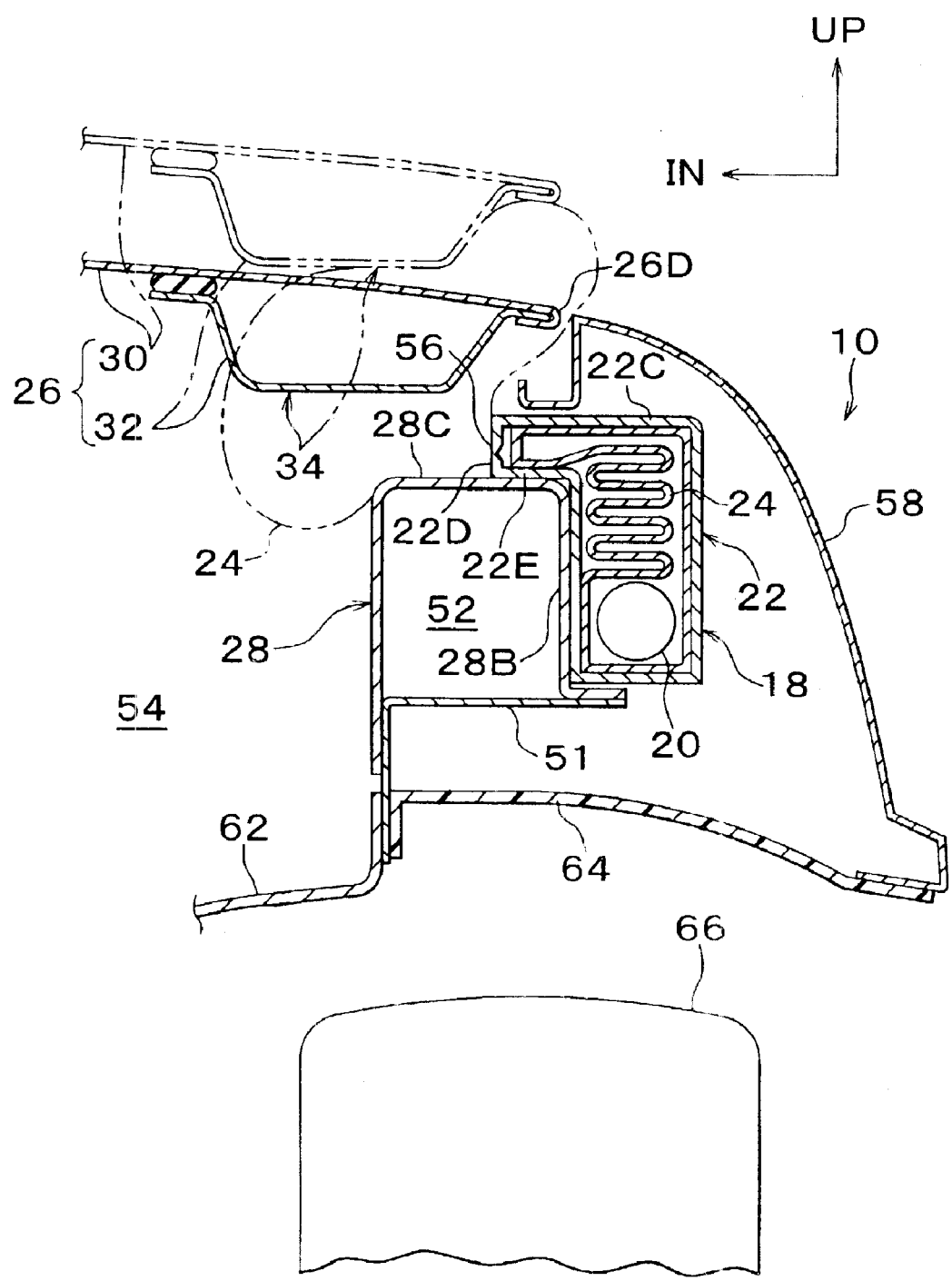
FIG. 4 is an enlarged sectional view taken on line 4—4 in FIG. 3.

As shown in FIG. 4, the hood 26 is substantially made up of an outer panel 32 and an inner panel 30. A skeleton portion 34 extending in the vehicle longitudinal direction is formed in each of two outer edge portions of the hood 26 in the vehicle transverse direction.

As shown in FIG. 3, each skeleton portion 34 of the hood 26 has, in the longitudinal-direction central portion 26A, a depression 36 as a weak portion that is depressed from below, that is, formed by depressing a portion of the inner panel 30 upward.

A striker 35 is disposed on a transverse-direction central portion of a front end portion 26B of the hood 26. The striker 35 is engaged with a well-known hood lock 40 disposed on a radiator support upper member 38 that is disposed in a front end portion of the vehicle body. A rearward portion 26C of the hood 26 is connected at its two transverse-direction end portions to a rear end portion 28A of an apron upper member 28 by a hinge mechanism 42. During a normal state, the hood 26 can be opened and closed as hinge arms 50 fixed to the hood 26 pivot about shafts 48 disposed in rearward portions of links 46 fixed to the apron upper member 28.

As shown in FIG. 4, the apron upper member 28, together with a lower member 51, forms a closed section portion 52 that extends in the vehicle longitudinal direction and has a rectangular sectional shape. An air bag case 22 is attached to a transverse-direction outer surface of a transverse-direction outer wall portion 28B of the apron upper member 28. An upper end portion 22C of the air bag case 22 extends above an upper wall 28C of the apron upper member 28. A vertical wall portion 22D of the air bag case 22 facing an engine room 54 has a weak portion 56 that breaks when the air bag body is deployed.

The air bag body 24, after breaking the vertical wall portion 22D of the air bag case 22, pushes up a longitudinal-direction central portion of the skeleton portion 34 of the hood 26 as indicated by a two-dot chain line in FIG. 4.

In FIG. 4, reference numeral 62 represents a fender apron, and 64 represents a splash seal, and 66 represents a front tire.

As shown in FIG. 1, each air bag body 24 is inflated and deployed between the inner panel 30 and the apron upper member 28 so as to push up the longitudinal-direction central portion 26A of the hood 26. As a result, the longitudinal-direction central portion 26A of the hood 26 bends with the depression 36 serving as an origin of bending. Due to the inflating and deploying force of the air bag bodies 24, a forward portion of the hood 26 turns upward about an engaging portion between the striker 35 of the front end portion 26B and the hood lock 40, and simultaneously, the links 46 of the hinge mechanism 42 turn upwardly forward (in a direction indicated by an arrow A in FIG. 1) about forward shafts 70 overcoming the elastic force of springs 72, so that a space into which the air bag bodies 24 expand is formed and a needed amount of lift is secured.

Operation of this embodiment will next be described.

According to this embodiment, if the control device 16 determines that a collision during a vehicle run has been detected on the basis of a combination of an output signal from the sensor 14 and a vehicle speed signal, for example, a signal indicating that the vehicle is running at or above a predetermined speed (e.g., 20 km/h), the control device 16 supplies the actuation current to the inflator 20 of each air bag device 18.

As a result, the inflators 20 are actuated so that gas from the inflators 20 flows into the air bag bodies 24, and therefore the air bag bodies 24 are inflated and deployed. At this time, the engine room-facing vertical wall portion 22D of each air bag case 22 having the weak portion 56 breaks. After breaking the vertical wall portions 22D, the air bag bodies 24 push up the longitudinal-direction central portion 26A of the hood 26 as indicated by the two-dot chain line in FIG. 4.

As a result, the longitudinal-direction central portion 26A of the hood 26 bends with the depression 36 serving as an origin. Due to the inflating and deploying force of the air bag bodies 24, a forward portion of the hood 26 turns upward about an engaging portion between the striker 35 of the front end portion 26B and the hood lock 40, and simultaneously, the links 46 of the hinge mechanism 42 turn upwardly forward (in a direction indicated by the arrow A in FIG. 1) about the forward shafts 70 overcoming the elastic force of the springs 72, so that a space into which the air bag bodies 24 expand is formed.

Therefore, this embodiment increases the amount of lift of the longitudinal-direction central portion 26A of the hood 26 while reducing the lift-up time of the hood 26 to a predetermined value. Hence, the load absorption stroke of the longitudinal-direction central portion 26A of the hood 26 can be increased, and the impact of a colliding body S indicated in FIG. 1 can be reduced. Furthermore, since the hood 26 bends at the depression 36, the amount of lift of the rearward portion 26C of the hood 26 can be reduced to a predetermined value.

Furthermore, in this embodiment, since the air bag devices 18 having the air bag bodies 24 as a lifter are disposed within fenders 58 below the hood, the air bag devices 18 having the air bag bodies 24 do not degrade the external appearance of the vehicle body 10. Furthermore, as the air bag bodies 24 are folded, the containment spaces thereof can be reduced.

In the embodiment, the depression 36 is formed as a weak portion by depressing a portion of the longitudinal-direction central portion 26A of the hood 26 from below, the hood 26 will readily bend with the depression 36 serving as an origin of bending if the longitudinal-direction central portion 26A of the hood 26 is lifted.

Furthermore, in the embodiment, the engine room 54-facing vertical wall portions 22D of the air bag cases 22 have weak portions 56 that break when the air bag bodies 24 are inflated and deployed. Entrance of rainwater or the like into an air bag case 22 via the weak portion 56 can be prevented even if the weak portion 56 deteriorates and has a crack or the like due to rainwater entering via a gap between the hood 26 and the fender 58. It is also possible to form a weak portion 56 in a lower wall portion 22E (see FIG. 4) of each air bag case 22 that is closer to the engine room 54.

Figure 5:
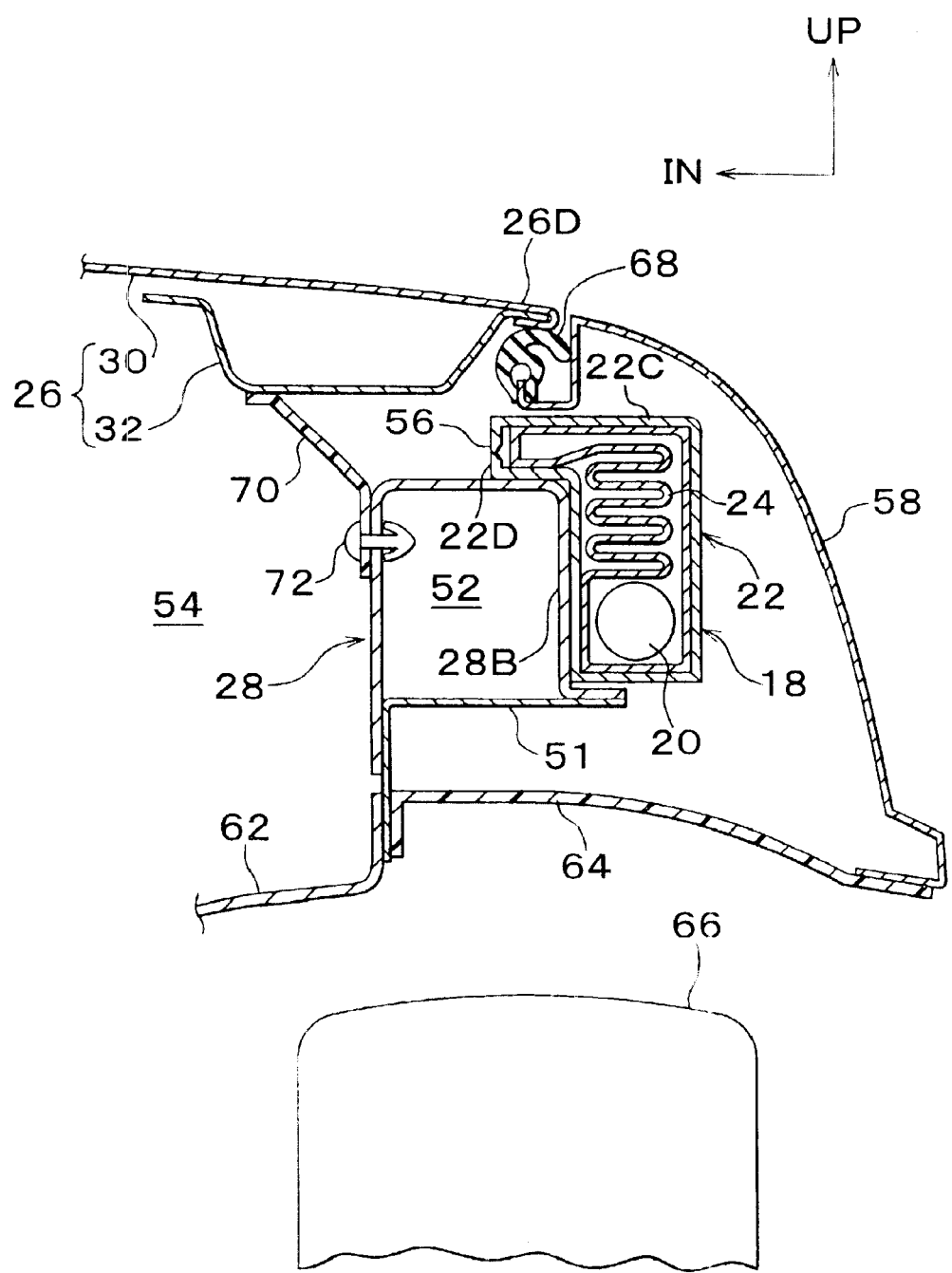
FIG. 5 is a sectional view a hood structure of a motor vehicle in accordance with a modification of the first embodiment of the invention, corresponding to FIG. 4.

As shown in FIG. 5, in order to further protect the air bag case 22 from rainwater, a seal rubber piece 68 may be disposed on an upper end edge portion of the fender 58 so as to seal the gap between the fender 58 and a transverse-direction outer edge portion 26D of the hood 26. Furthermore, in order to protect the air bag case 22 from heat from the engine room 54, a heat insulator 70 may be attached to the apron upper member 28 through the use of a clip 72 so as to seal the gap between the apron upper member 28 and the hood 26.

Figure 6:
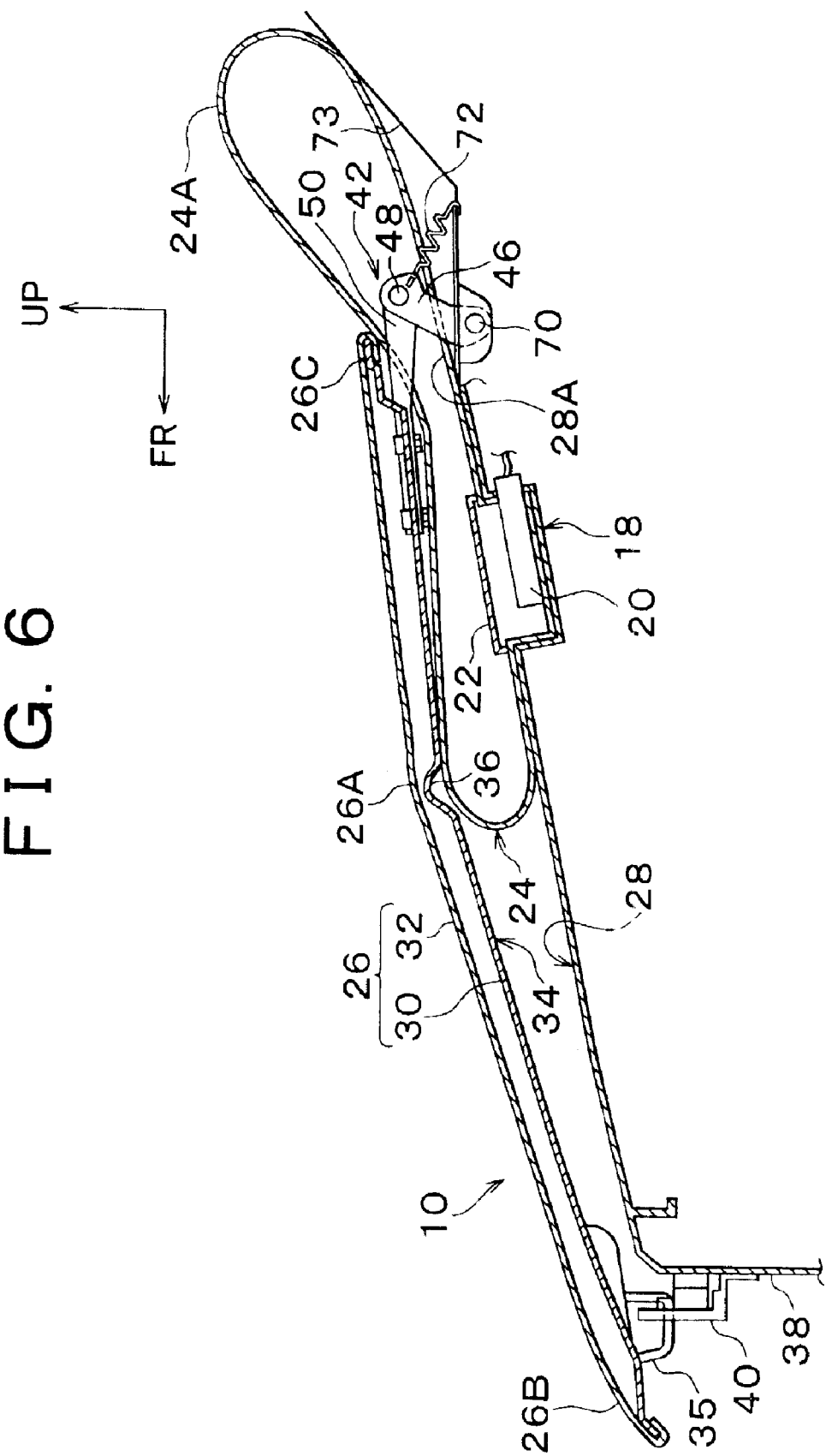
FIG. 6 is a side sectional view of a hood structure of a motor vehicle in accordance with a modification of the first embodiment of the invention, corresponding to FIG. 1.

As shown in FIG. 6, it is also possible to adopt a construction in which a rearward portion 24A of the air bag body 24 extends rearward relatively to the vehicle so that the rearward portion 24A of the air bag body 24 protrudes from the rearward portion 26C of the hood 26, and covers an A pillar 73 that is a vehicle body frame member. This construction will further reduce the damage to the colliding body S.

A second embodiment of the hood structure of a motor vehicle of the invention will be described with reference to FIGS. 7 and 8.

Components and portions of the second embodiment comparable to those of the first embodiment are represented by comparable reference characters, and will not be described in detail below.

Figure 7:
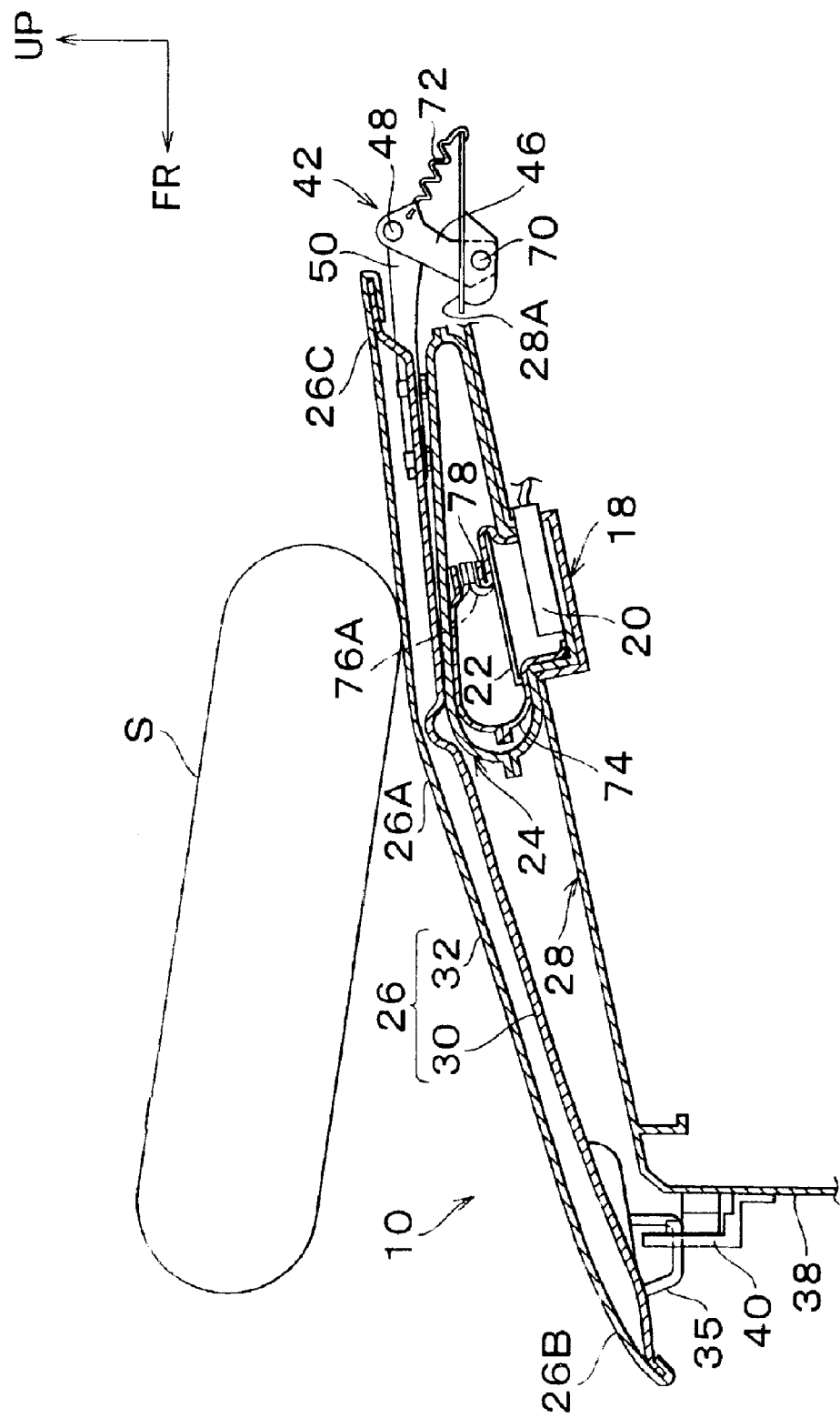
FIG. 7 is a side sectional view of a hood structure of a motor vehicle in accordance with a second embodiment of the invention, illustrating a deployed state of an air bag body.

As shown in FIG. 7, an auxiliary air bag body 74 is disposed as a small-capacity lift means within an air bag body 24. Gas jetted from an inflator 20 first enters the auxiliary air bag body 74, and thereby inflates and deploys the auxiliary air bag body 74. When inflated and deployed, the auxiliary air bag body 74 lifts a longitudinal-direction central portion 26A of a hood 26 by pushing it via the air bag body 24. The auxiliary air bag body 74 is disposed at a site within the air bag body 24 that is closest to the longitudinal-direction central portion 26A of the hood 26.

Figure 8:
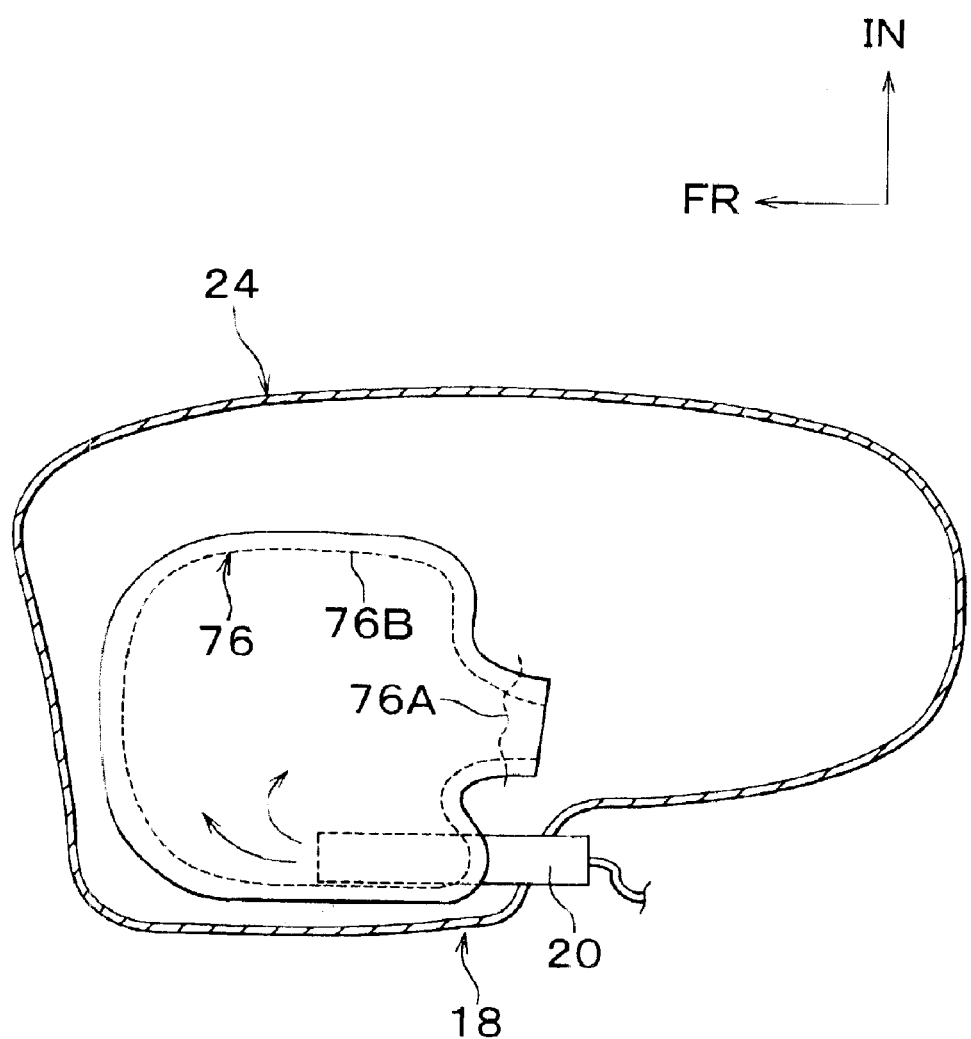
FIG. 8 is a horizontal sectional view of an air bag body of the motor vehicle hood structure of the second embodiment of the invention.

As shown in FIG. 8, in the auxiliary air bag body 74, a portion of a sewn peripheral portion 76 is formed as a breakable portion 76A that forms a relief device. The breakable portion 76A is more easily breakable than other sewn portions 76B, due to the use of a thinner sewing thread, or the like. Therefore, if the internal pressure of the auxiliary air bag body 74 sufficiently rises, and exceeds a predetermined value, the breakable portion 76A of the sewn peripheral portion 76 breaks, so that gas flows from the auxiliary air bag body 74 into the air bag body 24 via an opening portion 78 (see FIG. 7) formed at the broken site. As a result, the air bag body 24 is inflated and deployed, and supports the hood 26 with a large contact area.

Next, operation of the embodiment will be described.

This embodiment provides the same operation and advantages as the first embodiment. Furthermore, since the auxiliary air bag body 74 is provided within the air bag body 24, the longitudinal-direction central portion 26A of the hood 26 can be rapidly lifted due to the earlier inflation and deployment of the auxiliary air bag body 74 having a smaller capacity than the air bag body 24. Still further, since the auxiliary air bag body 74 lifts the longitudinal-direction central portion 26A of the hood 26 in a concentrated manner, the hood 26 can be reliably and rapidly bent with the depression 36 serving as an origin of bending.

If the internal pressure of the auxiliary air bag body 74 exceeds the predetermined value, the breakable portion 76A of the sewn peripheral portion 76 breaks, so that via the opening portion 78 (see FIG. 7) formed at the broken site, gas flows out of the auxiliary air bag body 74 into the air bag body 24. Then, the fully inflated and deployed air bag body 24 supports the hood 26 with a large contact area.

In this embodiment, a portion of the sewn peripheral portion 76 of the auxiliary air bag body 74 is formed as the breakable portion 76A that functions as a relief device. However, this construction may be replaced by a construction in which the auxiliary air bag body 74 has a gas outlet opening that is formed as a relief device beforehand, and the size of the gas outlet opening is suitably pre-set so that the air bag body 24 is inflated and deployed prior to the auxiliary air bag body 74.

Figure 9:
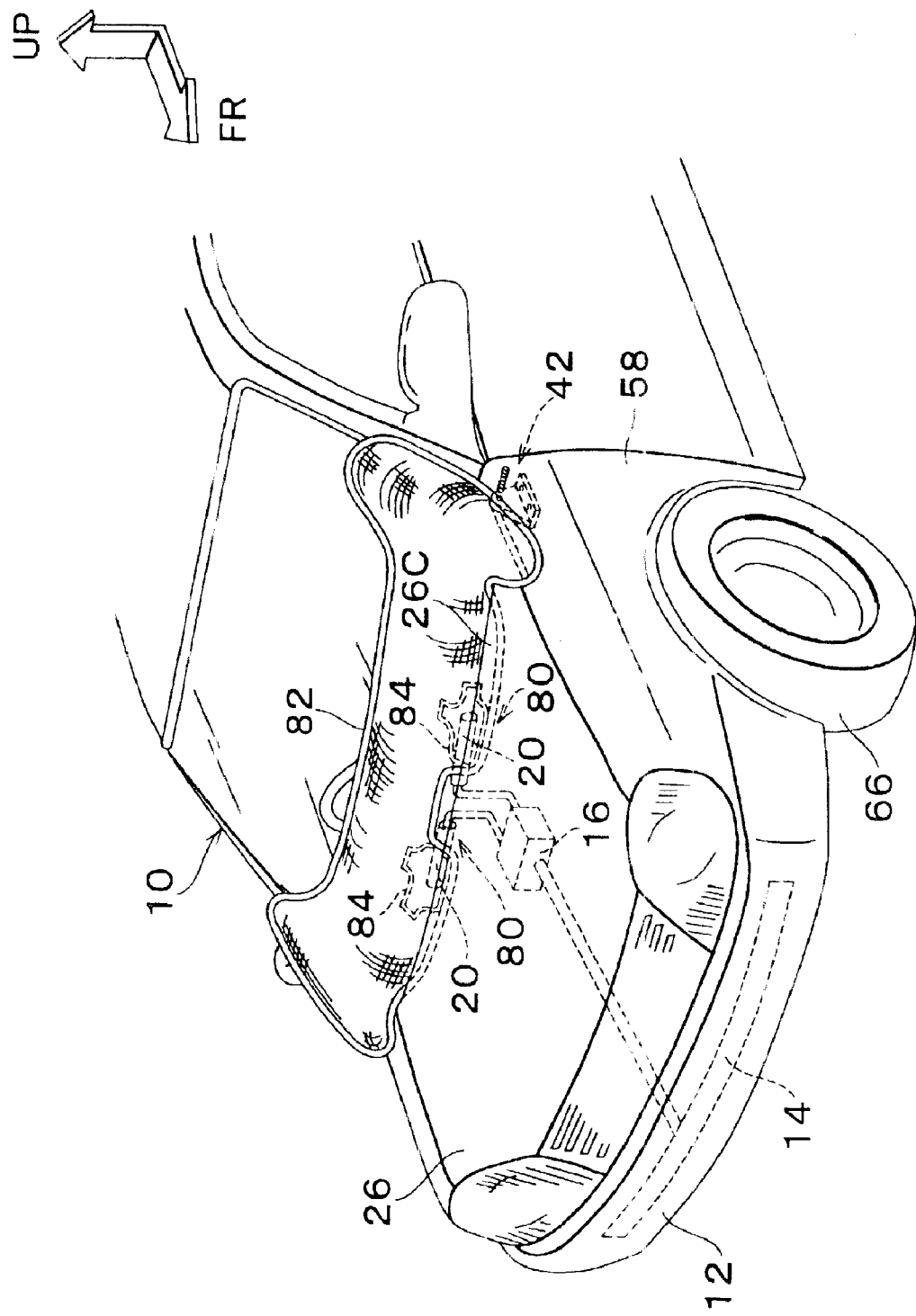
FIG. 9 is a perspective view of the motor vehicle hood structure in accordance with a modification of the second embodiment of the invention, viewed from diagonally forward of the vehicle.

Furthermore, in a construction as shown in FIG. 9 where air bag devices 80 are disposed near a rearward portion 26C of a hood 26, it is also possible to dispose, within an air bag body 82, auxiliary air bag bodies 84 for lifting the rearward portion 26C of the hood 26.

A third embodiment of the hood structure of a motor vehicle will be described with reference to FIGS. 10 to 16.

Components and portions of this embodiment comparable to those of the first embodiment are represented by comparable reference characters, and will not be described in detail below.

Figure 12:
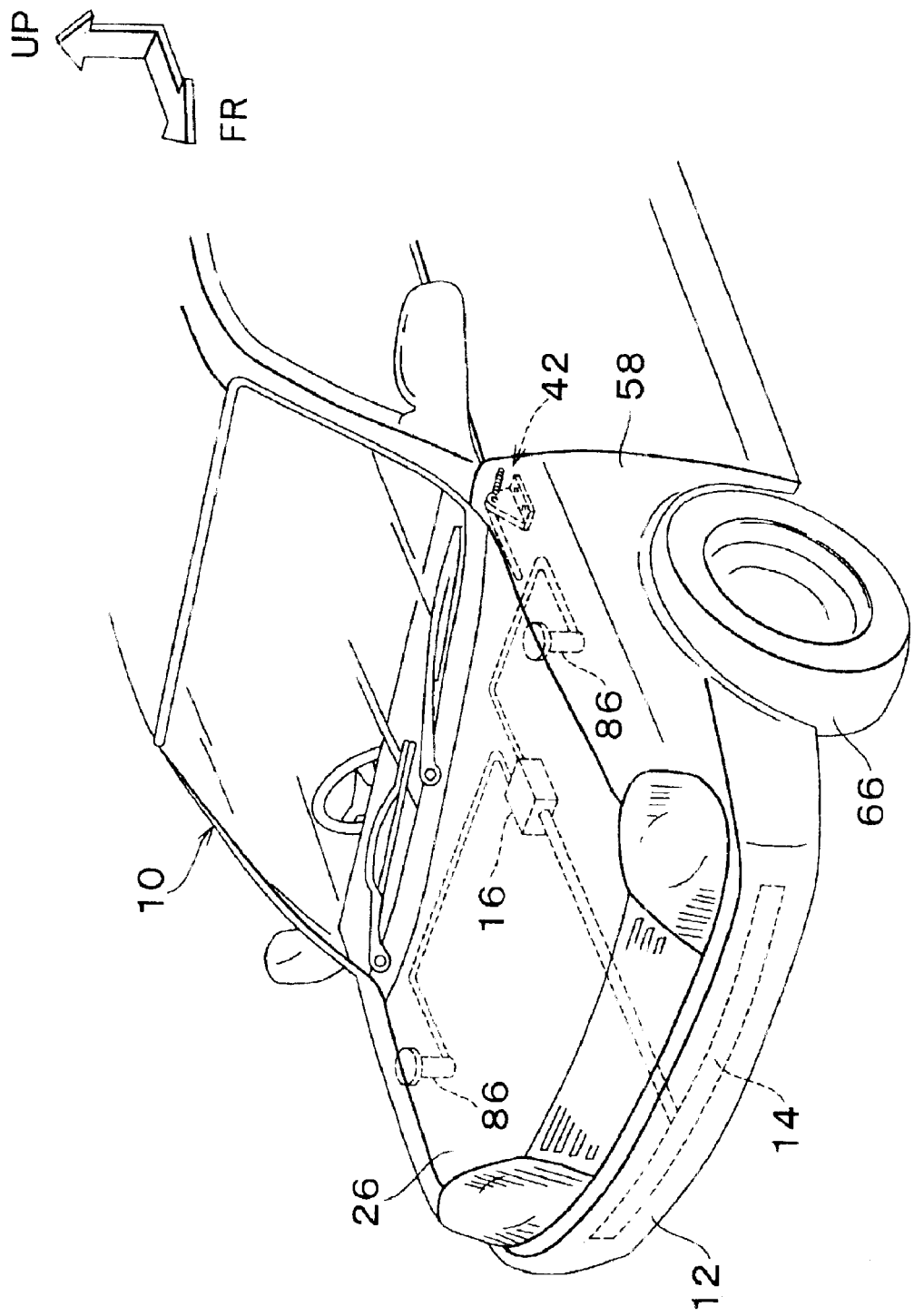
FIG. 12 is a perspective view of the motor vehicle hood structure of the third embodiment of the invention, viewed from diagonally forward of the vehicle.

In this embodiment, as shown in FIG. 12, a control device 16 supplies actuation current to left and right lifters 86 that function as linear movement devices that are lifter.

Figure 15:
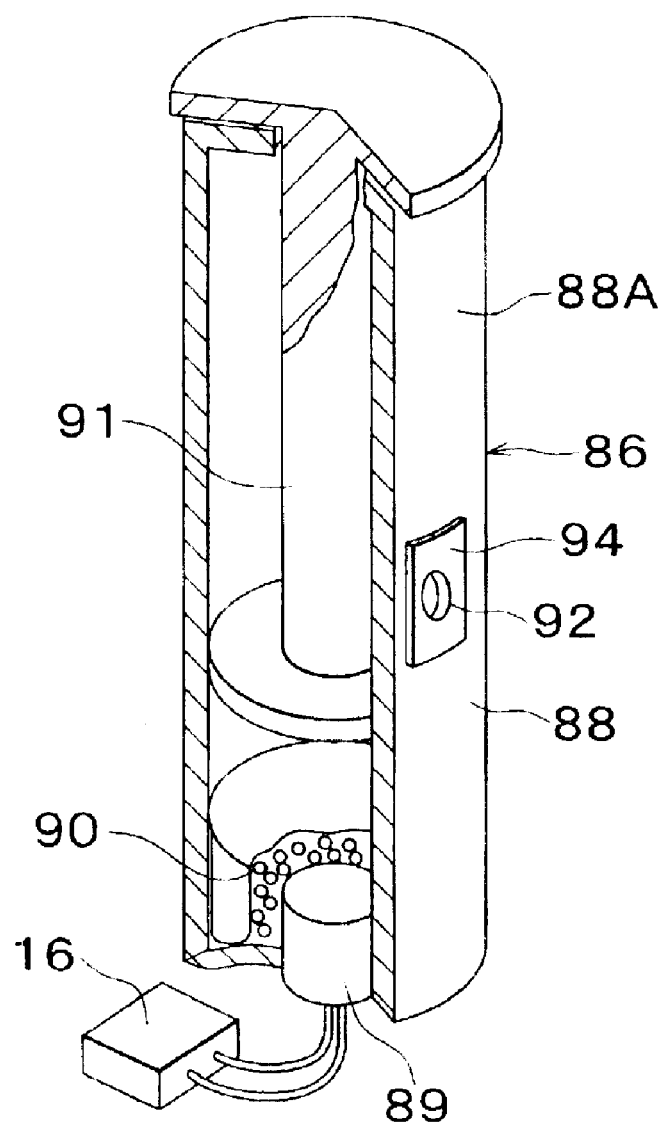
FIG. 15 is a perspective view of the lifter of the motor vehicle hood structure of the third embodiment of the invention, with a partial section of the lifter, illustrating a normal state of the lifter.

As shown in FIG. 15, upon supply of the actuation current to a lifter 86, an ignition device 89 disposed in a bottom portion of a cylinder 88 is actuated so that a gas generating agent 90 disposed around the ignition device 89 ignites, and generates gas. A vertically movable piston 91 is disposed above the gas generating agent 90 in the cylinder 88. A side wall portion 88A of the cylinder 88 has an orifice 92 that is closed by a seal 94 for preventing entrance of moisture.

Figure 16:
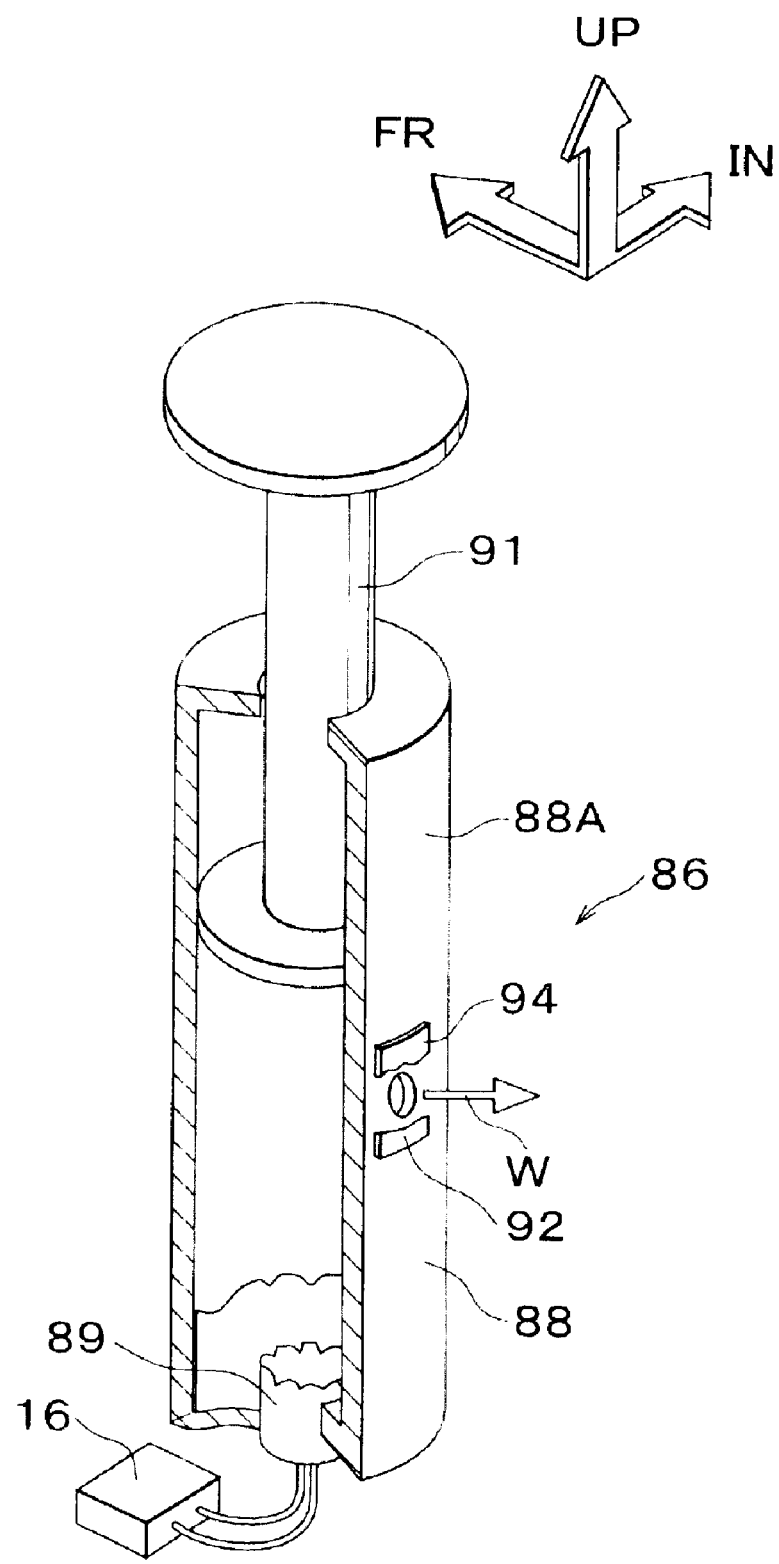
FIG. 16 is a perspective view of the lifter of the motor vehicle hood structure of the third embodiment of the invention, with a partial section of the lifter, illustrating an actuated state of the lifter.
Figure 17:
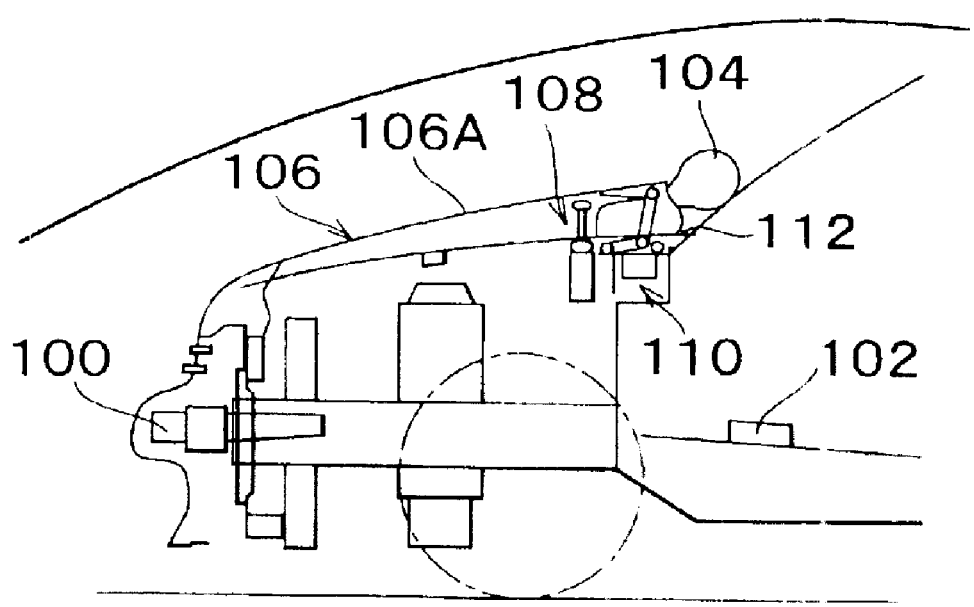
FIG. 17 is a side sectional view of a hood structure of a motor vehicle in accordance with a related art.

If the piston 91 is raised as shown in FIG. 16 by gas generated from the gas generating agent 90, and receives a load exerted from above, the seal 94 breaks, so that gas in the cylinder 88 flows out through the orifice 92 (as indicated by an arrow W in FIG. 16).

Figure 13:
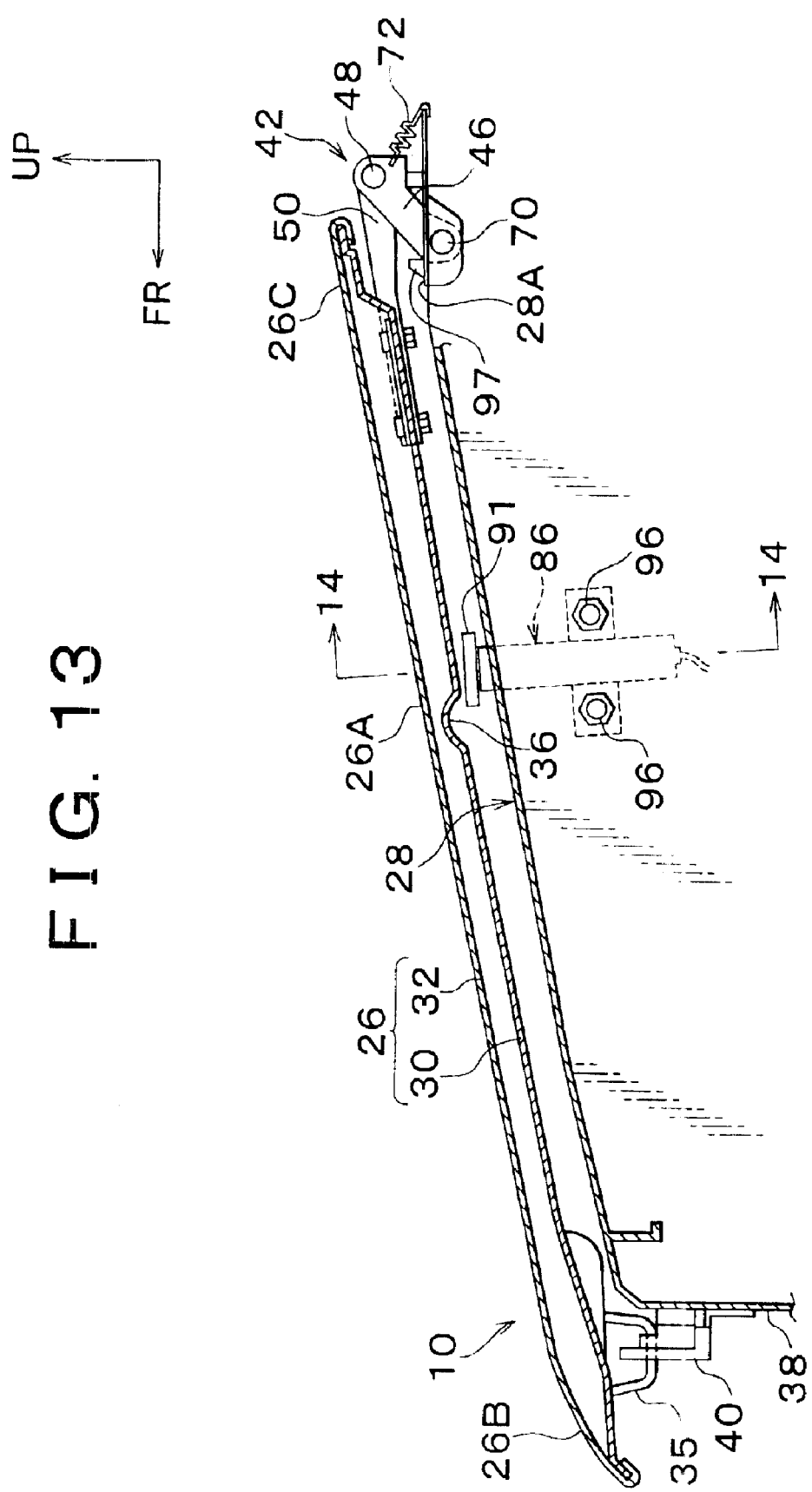
FIG. 13 is a side sectional view of the motor vehicle hood structure of the third embodiment of the invention, illustrating a normal state thereof.
Figure 14:
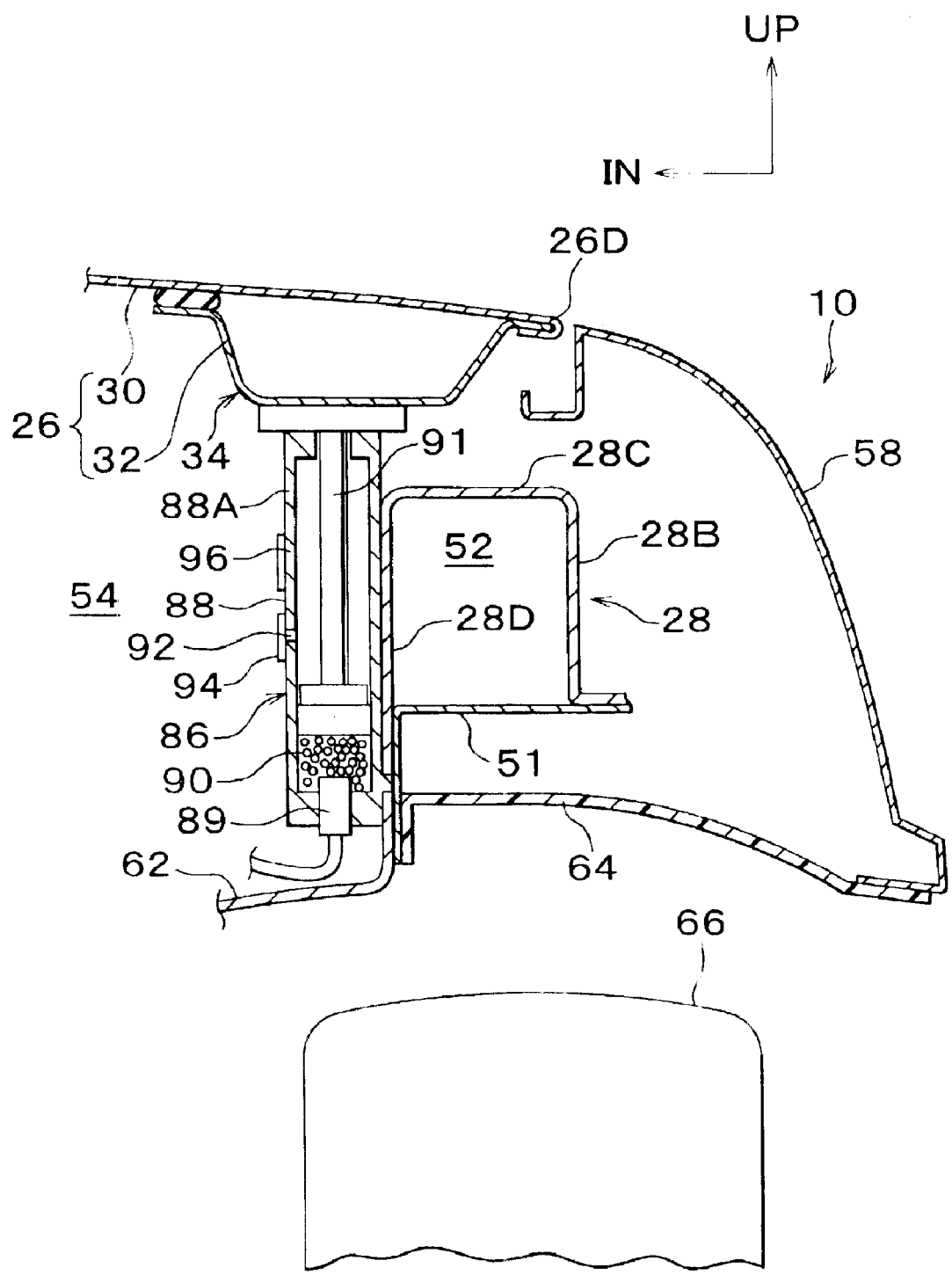
FIG. 14 is an enlarged sectional view taken on line 14—14 in FIG. 13.

Each lifter 86 is attached to a transverse-direction inner side surface of a transverse-direction inner side wall portion 28D of an apron upper member 28 as shown in FIG. 14, and is firmly fixed thereto by bolts 96 as shown in FIG. 13. The lifters 86 are disposed at opposite positions slightly rearward of a longitudinal-direction central portion 26A of the hood 26 so that each piston 91, when raised, pushes up a longitudinal-direction central portion of a skeleton portion 34 of the hood 26 as shown in FIG. 10.

Operation of this embodiment will next be described.

In this embodiment, if the control device 16 determines that a collision during a vehicle run has been detected on the basis of a combination of an output signal of the sensor 14 and a vehicle speed signal, the control device 16 supplies the actuation current to the ignition device 89 of each lifter 86.

Figure 10:
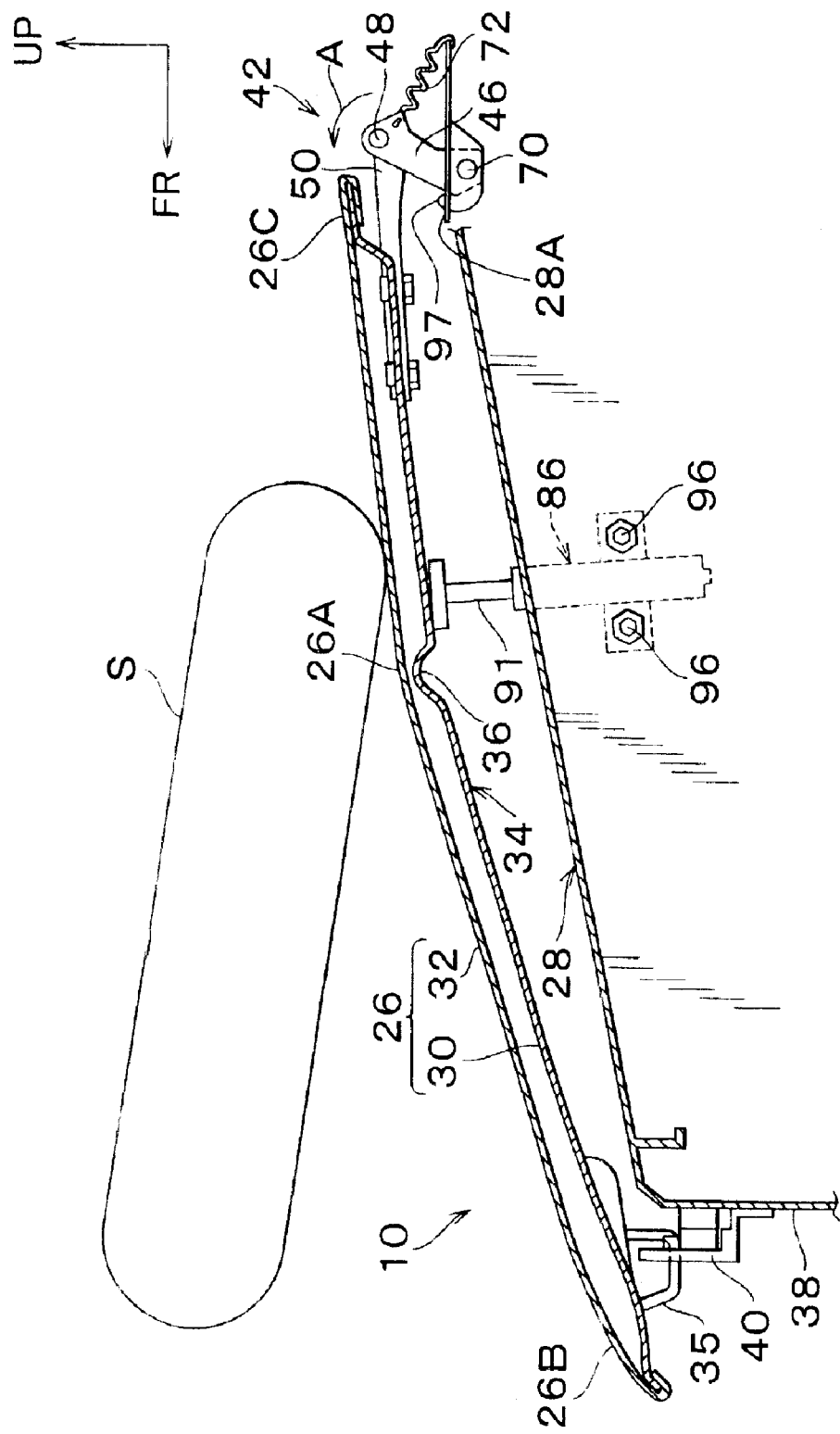
FIG. 10 is a side sectional view of a hood structure of a motor vehicle in accordance with a third embodiment of the invention, illustrating a lifted state of a lifter.
Figure 11:
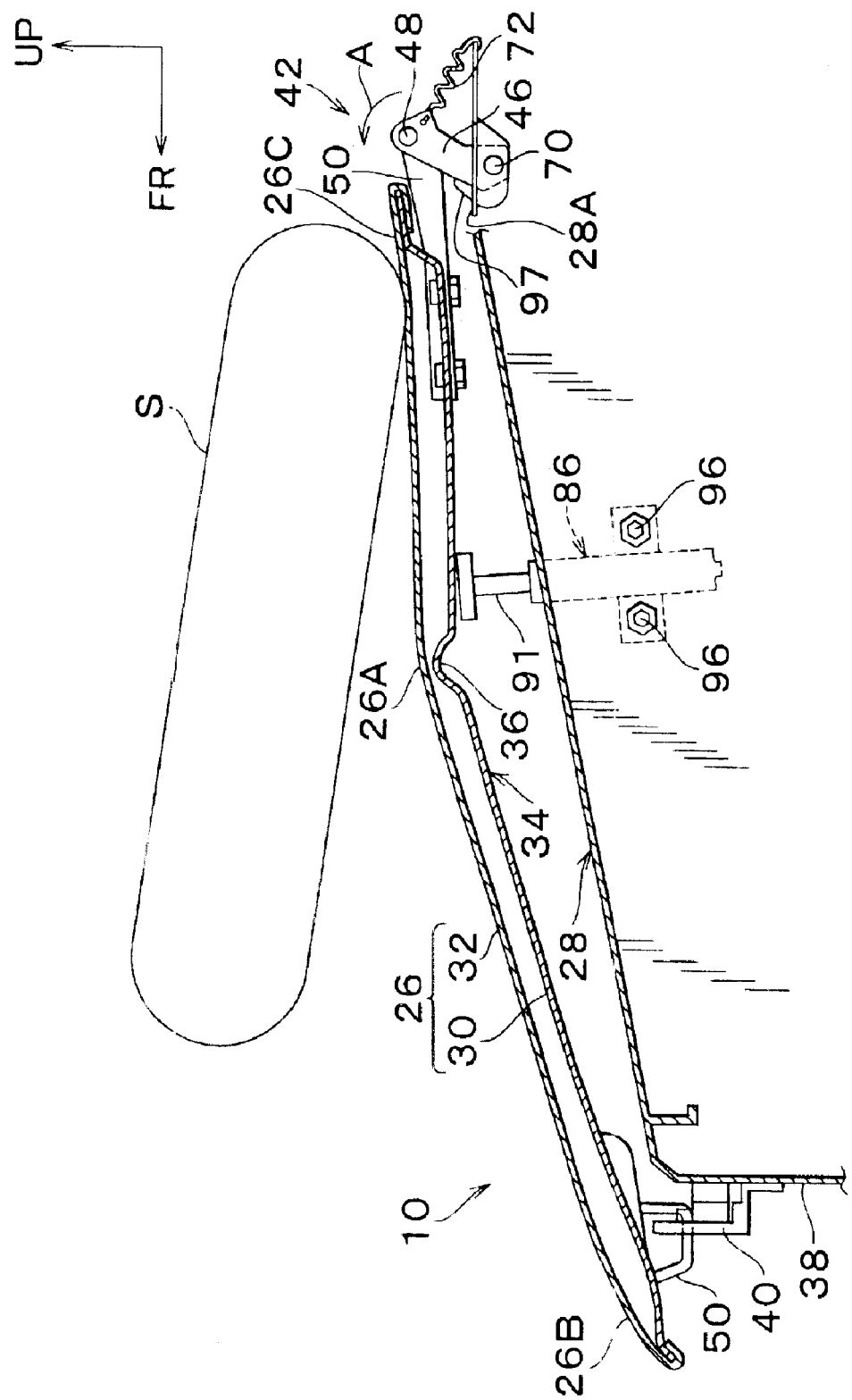
FIG. 11 is a side sectional view of the motor vehicle hood structure in accordance with the third embodiment of the invention, illustrating a lifted state of the lifter.

As a result, the gas generating agent 90 of each lifter 86 is ignited, and the gas generated therefrom raises the piston 91, so that the longitudinal-direction central portion 26A of the hood 26 is rapidly and reliably moved upward as shown in FIGS. 10 and 11.

Therefore, the longitudinal-direction central portion 26A of the hood 26 bends with the depression 36 functioning as an origin. At this time, due to the inflating and deploying force of the air bag bodies 24, a forward portion of the hood 26 turns upward about an engaging portion between the striker 35 of the front end portion 26B and the hood lock 40, and simultaneously, the links 46 of the hinge mechanism 42 turn upwardly forward (in a direction indicated by an arrow A in FIGS. 10 and 11) about the forward shafts 70 overcoming the elastic force of the springs 7.

Therefore, this embodiment is able to increase the amount of lift of the longitudinal-direction central portion 26A of the hood 26 while reducing the lift-up time of the hood 26 to a predetermined value. Hence, the load absorption stroke of the longitudinal-direction central portion 26A of the hood 26 can be increased, and the impact of a colliding body S can be reduced. Furthermore, since the hood 26 bends at the depression 36, the amount of lift of the rearward portion 26C of the hood 26 can be reduced to a predetermined value.

If a colliding body S strikes the longitudinal-direction central portion 26A of the hood 26 as shown in FIG. 10, the impact is mainly absorbed by the lifters 86. In this case, due to the impact of the colliding body S striking the hood 26, the piston 91 of each lifter 86 is pressed downward, and therefore, the gas pressure in the cylinder 88 increases, and breaks the seal 94. Hence, gas flows out through the orifice 92, and the piston 91 moves downward, absorbing the impact of the colliding body S.

If a colliding body S strikes a portion of the hood 26 near the rear end thereof as shown in FIG. 11, impact is absorbed by the lifters 86 while the impact of the colliding body S is also reduced in the following manner. That is, a link 46 of a hinge mechanism 42 tends to further turn in the direction indicated by the arrow A, and impinges on a stopper 97 and therefore stops turning. Hence, a hinge arm 50 and the rearward portion 26C of the hood 26 deform, absorbing impact.

Furthermore, according to the embodiment, the piston 91 of each lifter 86 linearly rises, and rapidly and reliably raises a longitudinal-direction central portion of a skeleton portion 34 of the hood 26. Therefore, compared with the embodiments employing air bag bodies, this embodiment is able to rapidly and reliably raise the longitudinal-direction central portion 26A of the hood 26.

Furthermore, in this embodiment, the lifters 86 as lifters are disposed within the engine room 54 below the hood. Therefore, the lifters 86 do not degrade the external appearance of the vehicle body 10.

Although the embodiment employs the lifters 86 each having the cylinder 88 and the piston 91 as linear movement devices that function as lifters, the linear movement devices are not limited to this construction, but may also be provided as other constructions, for example, solenoids or the like.

While the invention has been described with reference to what are presently considered to be preferred embodiments thereof, it is to be understood that the invention is not limited to the disclosed embodiments or constructions. To the contrary, it is apparent to those skilled in the art that the invention is intended to cover various modifications and equivalent arrangements. For example, although in the foregoing embodiments, the longitudinal-direction central portion 26A of the hood 26 has the depression 36 as a weak portion, the weak portion is not limited to the depression 36, but may be provided in other fashions, for example, as a thin-wall portion or the like. Furthermore, the lifters, such as the air bag bodies 24, the lifters 86, etc., may be provided on the hood 26. In that case, the lifter pushes the vehicle body to raise a longitudinal-direction central portion of the hood.

What is claimed is:

1. A hood structure of a motor vehicle, comprising:
   a collision detector that detects a collision at a forward portion of the vehicle;
   a lifter that raises a vehicle longitudinal-direction central portion of the hood upon receiving a signal from the collision detector;
   a weakened portion which serves as an origin of bending, provided in a longitudinal-direction central portion of a skeleton portion of the hood, the skeleton portion extending in a longitudinal direction; and
   a mechanism that connects a rear end portion of the hood to a vehicle body, and that moves a connected portion between the hood and the vehicle body forward relative to the vehicle when the hood is bent by an operation of the lifter.

2. The hood structure of a motor vehicle according to claim 1, wherein the lifter is disposed in an engine compartment below the hood.

3. The hood structure of a motor vehicle according to claim 1, wherein the lifter is disposed in a fender.

4. The hood structure of a motor vehicle according to claim 1, wherein the lifter is an air bag body that raises the hood when inflated and deployed.

5. The hood structure of a motor vehicle according to claim 4, wherein the air bag body is exposed rearward of the hood when deployed.

6. The hood structure of a motor vehicle according to claim 4, wherein the lifter bends the vehicle longitudinal-direction central portion of the hood.

7. The hood structure of a motor vehicle according to claim 4, wherein the lifter is disposed in at least one of a fender and an engine room below the hood.

8. The hood structure of a motor vehicle according to claim 1, wherein the lifter is a linear movement device that raises the hood when actuated.

9. The hood structure of a motor vehicle according to claim 8, wherein the lifter bends the vehicle longitudinal-direction central portion of the hood.

10. The hood structure of a motor vehicle according to claim 9, wherein the lifter is disposed in a fender.

11. The hood structure of a motor vehicle according to claim 9, wherein the lifter is disposed in an engine compartment below the hood.

12. A hood structure of a motor vehicle, comprising:
    a collision detector that detects a collision at a forward portion of the vehicle;
    a lifter that raises a vehicle longitudinal-direction central portion of the hood upon receiving a signal from the collision detector, said lifter being an air bag that raises the hood when inflated and deployed;
    a weakened portion which serves as an origin of bending, provided in a longitudinal-direction central portion of a skeleton portion of the hood, the skeleton portion extending in a longitudinal direction;
    an auxiliary air bag body disposed within the air bag body, and having a smaller capacity than the air bag body; and
    a relief device that releases an internal gas of the auxiliary air bag body into the air bag body if an internal pressure of the auxiliary air bag body exceeds a predetermined value.

* * * * *